United States Patent [19]

Woodall

[11] 4,438,292
[45] Mar. 20, 1984

[54] WATERPROOF HOUSING ASSEMBLY FOR GEOPHONES

[75] Inventor: James C. Woodall, Houston, Tex.

[73] Assignee: Mark Products, Inc., Houston, Tex.

[21] Appl. No.: 411,467

[22] Filed: Aug. 25, 1982

[51] Int. Cl.³ ............................................. G01V 1/16
[52] U.S. Cl. .............................. 174/52 R; 174/65 SS; 367/188
[58] Field of Search ............... 174/52 R, 52 S, 65 SS, 174/65 R, 77 R, 151; 367/188; 339/60 R, 60 M, 94 R, 94 M, 151 C

[56] References Cited

U.S. PATENT DOCUMENTS

| | | | |
|---|---|---|---|
| 2,361,215 | 10/1944 | Lamberger et al. | 174/65 SS X |
| 2,750,436 | 6/1956 | Richter | 174/77 R |
| 3,931,453 | 1/1976 | Hall, Jr. | 174/65 R |
| 4,122,433 | 10/1978 | McNeel | 367/188 |

FOREIGN PATENT DOCUMENTS 904825 11/1945 France ............................. 174/77 R

*Primary Examiner*—A. C. Prescott
*Assistant Examiner*—D. A. Tone
*Attorney, Agent, or Firm*—Vaden, Eickenroht, Thompson, Bednar & Jamison

[57] ABSTRACT

A waterproof housing assembly for a geophone is disclosed that includes a housing having an elongated cavity. A geophone is mounted in the bottom portion of the cavity. A two conductor takeout cable extends into the cavity that has a first section where the outer sheath and insulation are stripped from the two conductors part of the way back from the end. A second section of the cable adjacent the first has the outer sheath removed from the insulated conductors. A body of elastomeric material is located in the cavity. It has a first pair of spaced openings through which the uninsulated first section of the cable extends to be connected to the geophone, a second pair of spaced openings connected to the first pair in which the second section of the cable is located, and a single opening connected to the second pair in which a portion of the sheathed cable is located. Means are provided to compress the body of elastomeric material into sealing engagement with the housing and with the uninsulated conductors, the insulated conductors, and the outer sheath of the cable to prevent water from entering the portion of the housing containing the geophone even if the outer sheath and the insulation on the conductors develop a leak outside the housing.

3 Claims, 4 Drawing Figures

U.S. Patent Mar. 20, 1984 4,438,292
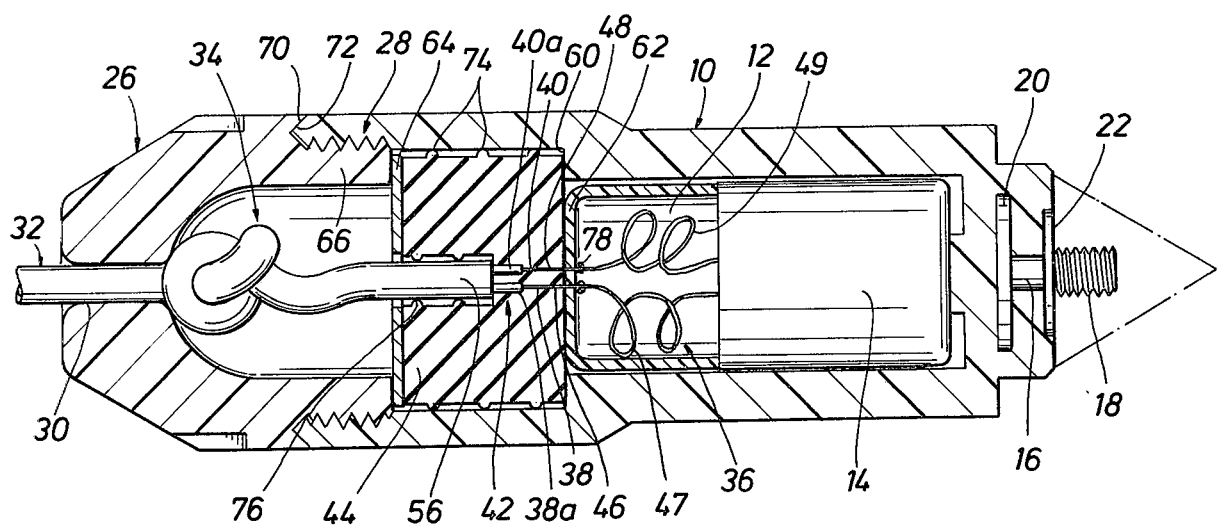
FIG.1
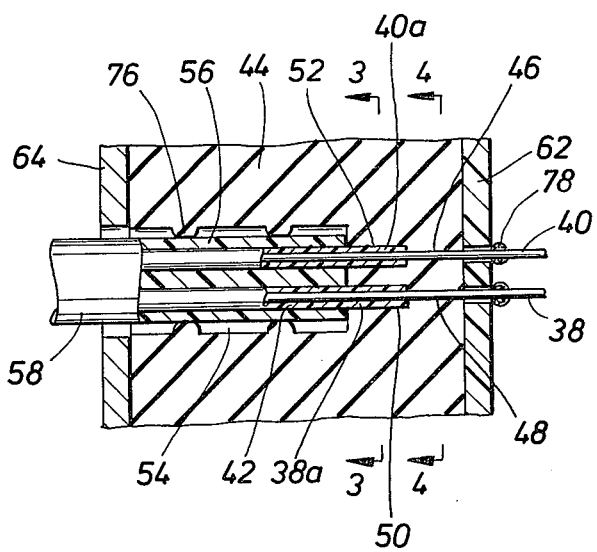
FIG.2
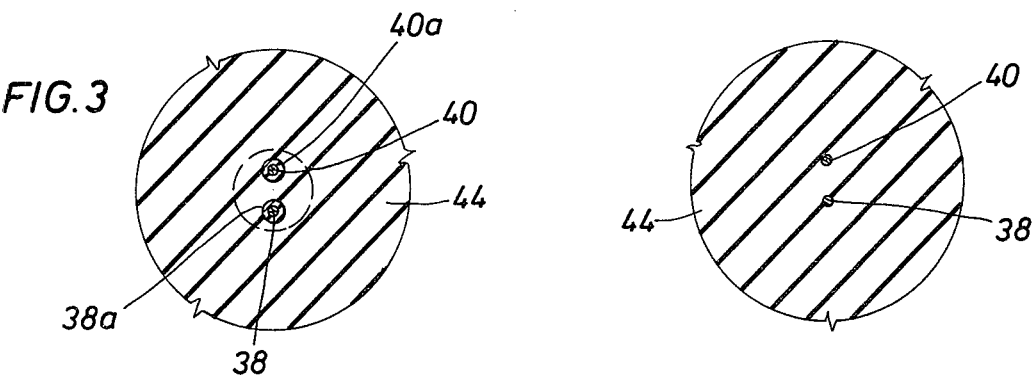
FIG.3
FIG.4

WATERPROOF HOUSING ASSEMBLY FOR GEOPHONES

This invention relates to housing assemblies for protecting geophones in the field, and in particular to waterproof housing assemblies for geophones used in swampy or marshy areas.

Geophones that are intended for use in swamps, marshes, and shallow bays are usually protected from the water in which they are to be submerged by housings rated to withstand water pressure of about 100 psi without leaking. The most common source of water leakage into the cavity of the housing in which the geophone is located is through or along the takeout cable. This is the cable that extends into the housing and connects the geophone to the main cable. Typically, it has individually insulated conductors that are covered by an outer sheath of water impervious insulating material. Prior housings included a seal between the housing and the outer sheath to prevent water from migrating into the housing along the outer sheath. If a hole developed in the outer sheath, however, water could travel along the conductors into the housing bypassing the seal between the sheath and the housing.

It is an object of this invention to provide a waterproof housing for a geophone that provides a seal that will prevent water from migrating into the geophone cavity of the housing either along the outer sheath or along the insulated conductors themselves.

It is a further object of this invention to provide a waterproof housing for a geophone that prevents the migration of water into the geophone cavity of the housing along the outer sheath, along the insulated conductors, or along the conductors themselves should the insulation on the conductors develop a leak.

It is another object of this invention to provide a waterproof housing for a geophone in which a body of elastomeric material is compressed into sealing engagement with the outer sheath, the insulated conductors, and the uninsulated conductors to prevent moisture or water from entering the geophone cavity along the sheath, along the insulated conductors, or along the conductors.

It is another object of this invention to provide such a housing that includes a threaded joint for compressing the body of elastomeric material into such sealing engagement with the members making up the takeout cable and engaging inclined surfaces that produce a force, when the joint is made up, urging the mating threads together to reduce the tendency of the joint to loosen in service.

These and other objects, advantages, and features of this invention will be apparent to those skilled in the art from a consideration of this specification, including the attached drawings and appended claims.

In the drawings:

FIG. 1 is a cross-sectional view through the preferred embodiment of the housing assembly of this invention;

FIG. 2 is a view, on an enlarged scale, of the sealing element of FIG. 1 in sealing engagement with the components of the takeout cable;

FIG. 3 is a sectional along line 3—3 of FIG. 2; and

FIG. 4 is a sectional along line 4, FIG. 2.

In the preferred embodiment of this invention, housing 10 is generally cylindrical in shape having cavity 12 that extends from the open end substantially, the length of the housing. Geophone 14 is located in the lower end of cavity 12.

Metal mounting pin 16, which has threaded portion 18 head 20, and intermediate flange 22, is embedded in the lower end of the housing with threaded portion 18 and the lower side of flange 22 exposed to allow a conical or spiked base to be attached to the housing. In FIG. 1, a conical base is shown in phantom lines as it would be attached to pin 16 and the bottom of the housing. Flange 22 is positioned in the end of the housing so that the conical or spiked base can be made up tightly on threaded portion 18, without exerting a compressure force on the plastic of the housing between head 20 and the base, as was previously the case, which often broke the housing.

The open end of cavity 12 is closed by cap 26, which is connected to housing 10 by threaded connection 28.

Extending through opening 30 in the end of cap 26 is two conductor takeout cable 32. The cable is tied in a knot, indicated generally by the number 34, to anchor the cable in the housing.

The cable has first section 36 at its end, where the two conductors, 38 and 40, have all insulation removed. The ends of the conductors are electrically connected to the output terminals (not shown) of geophone 14. Adjacent section 36 of the cable is section 42 where the outer sheath of the cable is removed exposing sections 38a and 40a of the insulated conductors.

Seal means comprising body 44 of elastomeric material, generally cylindrical in shape, is positioned adjacent the upper end of cavity 12 of housing 40 and is provided with a first pair of spaced openings 46 and 48 in which are located portions of conductors 38 and 40 of the takeout cable from which all insulation has been removed. The body of elastomeric material is also provided with a second pair of openings that are in line with openings 46 and 48, respectively, in which are located insulated conductor portions 38a and 40a of the cable. Opening 54 in body 44 is of an enlarged diameter and is located in line with openings 50 and 52. Portion 56 of the sheathed cable is located in this opening.

Means are provided to compress body 44 of elastomeric material to move it into sealing engagement with housing 10 and with the portions of the takeout cable extending through it. Cup-shaped member 62 of relatively rigid non-conductive material is located between body 44 and geophone 14 to confine body 44 and keep it from bulging further into cavity 12 when compressed. Located on the other side of body 44 is compression washer 64. It is between body 44 and the end of portion 66 of the cap that extends into cavity 12.

The dimensions of the housing and the cap and threaded connection 28 are such that when threaded connection 28 between the cap and the housing is made up, portion 66 of the cap will have moved far enough into cavity 12 to compress body 44 of elastomeric material between the end of portion 66 of the cap and cup-shaped member 62 to force the elastomeric material of body 44 to move into sealing engagement with the housing and with the portions of takeout cable 32 that extend through the openings in body 44. When so compressed, the body exerts a resilient force through cup-shaped member 62 that holds geophone 14 firmly against the bottom of cavity 12 in the housing.

Since it is important that the compressive force on body 44 be maintained while the housing assembly is in the field, means are provided to exert a force on the threaded connection between the housing and the cap urging the two threaded members of the connection together to decrease the likelihood that the threaded connection will loosen with changes in temperature and the like while in service. In the embodiment shown, the end of housing 40 is provided with inclined annular surface 70 that slopes outwardly toward the other end of the housing. Cap 26 is provided with inclined annular surface 72 that slopes at the same angle as inclined surface 70. These inclined surfaces are positioned to engage as the joint is made up so that inclined surface 72 on the cap will exert a force on inclined surface 70 of the housing urging the female portion of the threads on the housing into firm engagement with the male portion of the threads that are carried by cap 26.

To improve the seal between body 44 and housing 10, semi-circular annular ribs 74 are provided on the outside of the body. These ribs are semi-circular in cross section and, when forced into engagement with the inner surface of cavity 12 of the housing, they will act like "O" rings to provide a seal between body 44 and the housing. Similar annular semi-circular ribs 76 are located on the inner surface of opening 54 to engage the outer sheath of takeout cable 32 and provide a seal between body 44 and the outer sheath.

To assemble the geophone in the housing, takeout cable 32 is passed through the opening in the end of cap 26. Knot 34 is tied in the cable to anchor the cable in cap 26, and the ends of the cable are stripped as described above and passed through the openings in compression washer 64, body 44, and the two openings in the bottom of cup-shaped member 62.

Since conductors 38 and 40 of the takeout cable are relatively stiff in most cases, thinner, relatively flexible, insulated conductors 47 and 49 are connected between the ends of conductors 38 and 40 and the terminals of the geophone. Preferably, at the connection between the flexible insulated conductors and the takeout cable conductors, a sufficient amount of solder is used to form balls 78 adjacent the bottom of cup-shaped member 62. The balls of solder will hold the takeout cable from movement should knot 34 slip.

The uninsulated sections of conductors 38 and 40 should be thoroughly tinned or soldered in a thin tube so that a smooth surface is engaged by the elastomeric material of the seal means when it is impressed into sealing engagement with the takeout cable.

After the bare conductors are soldered or otherwise connected to the terminals of geophone 14, this entire assembly can be placed in housing 10. As shown, considerable slack is provided in flexible conductors 47 and 49. This is to allow the geophone to be positioned in cavity 12 before the rest of the assembly is moved into the cavity and the threaded connection between the cup and the housing is made up to compress the body of elastomeric material into sealing engagement with the cable and the housing.

From the foregoing, it will be seen that this invention is one well adapted to attain all of the ends and objects hereinabove set forth, together with other advantages that are obvious and that are inherent to the apparatus and structure.

It will be understood that certain features and subcombinations are of utility and may be employed without reference to other features and subcombinations. This is contemplated by and is within the scope of the claims.

Because many possible embodiments may be made of this invention without departing from the scope thereof, it is to be understood that all matter herein set forth or shown in the accompanying drawings is to be interpreted as illustrative and not in a limiting sense.

What is claimed is:

1. A waterproof housing and geophone assembly comprising a housing having an elongated cavity, a geophone in the cavity, means mounting the geophone in the bottom portion of the cavity, a two conductor cable extending into the cavity having a first section with the outer sheath and insulation stripped from the two conductors part of the way back from the end and a second section adjacent the first with the sheath removed from the insulated conductors, a body of elastomeric material in the cavity having a first pair of spaced openings through which the uninsulated first section of the cable extends to be connected to the geophone, a second pair of spaced openings connected to the first pair in which the second section of the cable is located, and a single opening connected to the second pair in which a portion of the sheathed cable is located, and means to compress the body of elastomeric material into sealing engagement with the housing and with the uninsulated conductors, the insulated conductors, and the outer sheath of the cable to prevent water from entering the portion of the housing containing the geophone even if the outer sheath and the insulation on the conductors develop a leak outside the housing.

2. A waterproof housing and geophone assembly comprising a housing having an elongated cavity, a geophone in the cavity, means mounting the geophone in the bottom portion of the cavity, a two conductor cable extending into the cavity having a first section with the outer sheath and insulation stripped from the two conductors part of the way back from the end and a second section adjacent the first with the sheath removed from the insulated conductors, a body of elastomeric material in the cavity having a first pair of spaced openings through which the uninsulated first section of the cable extends to be connected to the geophone, a second pair of spaced openings connected to the first pair in which the second section of the cable is located, and a single opening connected to the second pair in which a portion of the sheathed cable is located, and means to compress the body of elastomeric material into sealing engagement with the housing and with the uninsulated conductors, the insulated conductors, and the outer sheath of the cable to prevent water from entering the portion of the housing containing the geophone even if the outer sheath and the insulation on the conductors develop a leak outside the housing, said compressing means comprising a cap having a portion extending into the cavity of the housing to engage the body of elastomeric material and a threaded connection between the cap and the housing that will move the portion of the cap in engagement with the body of elastomeric material into the cavity to compress the elastomeric body upon relative rotation of the cap and housing.

3. The housing and geophone assembly of claim 2 in which the threads on the cap are male threads and the threads on the housing are female threads and in which the housing has an end surface that slopes outwardly toward the other end of the housing and the cap has a similarly tapered surface adjacent the inner end of the male threads that will engage the tapered surface on the end of the housing and exert a force on the housing urging the threads on the housing into engagement with the threads on the cap to reduce the tendency of the threads to unscrew and reduce the compressive force on the body of elastomeric material.

* * * * *